United States Patent
Yadav et al.

(10) Patent No.: US 12,401,015 B2
(45) Date of Patent: Aug. 26, 2025

(54) METALLIC ION INTERCALATED LAYERED STRUCTURES

(71) Applicant: RESEARCH FOUNDATION OF THE CITY UNIVERSITY OF NEW YORK, New York, NY (US)

(72) Inventors: Gautam G. Yadav, New York, NY (US); Xia Wei, New York, NY (US); Michael Nyce, New York, NY (US); Sanjoy Banerjee, New York, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 455 days.

(21) Appl. No.: 17/772,578

(22) PCT Filed: Oct. 30, 2020

(86) PCT No.: PCT/US2020/058315
§ 371 (c)(1),
(2) Date: Apr. 28, 2022

(87) PCT Pub. No.: WO2021/087329
PCT Pub. Date: May 6, 2021

(65) Prior Publication Data
US 2022/0376223 A1    Nov. 24, 2022

Related U.S. Application Data

(60) Provisional application No. 62/928,781, filed on Oct. 31, 2019.

(51) Int. Cl.
*H01M 4/04*    (2006.01)
*H01M 4/50*    (2010.01)
(Continued)

(52) U.S. Cl.
CPC ....... *H01M 4/0459* (2013.01); *H01M 4/0445* (2013.01); *H01M 4/50* (2013.01); *H01M 4/52* (2013.01); *H01M 4/661* (2013.01)

(58) Field of Classification Search
CPC .... H01M 4/0445; H01M 4/0459; H01M 4/48; H01M 4/50; H01M 4/52; H01M 4/5815; H01M 4/661; Y02E 60/10
See application file for complete search history.

(56) References Cited

U.S. PATENT DOCUMENTS

2017/0110765 A1    4/2017 Yadav et al.
2018/0309125 A1*  10/2018 Beidaghi ............. H01M 10/054

FOREIGN PATENT DOCUMENTS

WO    2018176063 A2    9/2018
WO    2019023546 A2    1/2019
WO    2021087329 A1    5/2021

OTHER PUBLICATIONS

International Preliminary Report on Patentability dated May 12, 2022, PCT/US2020/058315, filed on Oct. 30, 2020.
(Continued)

*Primary Examiner* — Victoria H Lynch
(74) *Attorney, Agent, or Firm* — Andrew M. Metrailer; Conley Rose, P.C.

(57) ABSTRACT

A system and method for forming a metallic ion intercalated layered structure can include a housing, an electrolyte disposed in the housing, a counter-electrode disposed in the housing, and a working electrode disposed in the housing. The working electrode comprises a metallic support; and an electrode paste. The electrode paste can include an active material and a binder. The system can be used to form a layered structure having metallic ions from the metallic support intercalated into the layered structure based on cycling the working electrode.

27 Claims, 12 Drawing Sheets

(51) Int. Cl.
    *H01M 4/52*    (2010.01)
    *H01M 4/66*    (2006.01)

(56)             References Cited

OTHER PUBLICATIONS

International Search Report and Written Opinion, dated Feb. 3, 2021, PCT/US2020/058315, filed on Oct. 30, 2020.
First Examination Report dated Oct. 24, 2024, India Application No. 202217022504, filed Dec. 30, 2020.

* cited by examiner

METALLIC ION INTERCALATED LAYERED STRUCTURES

CROSS-REFERENCE TO RELATED APPLICATIONS

This application is a filing under 35 U.S.C. 371 as the National Stage of International Application No. PCT/US2020/058315, filed on Oct. 30, 2020, entitled, "MITIGATING THE ZINCATE EFFECT IN ENERGY DENSE MANGANESE DIOXIDE ELECTRODES." and claims the benefit of: U.S. Provisional Application No. 62/928,781 filed on Oct. 31, 2019 and entitled "Metallic Ion Intercalated Layered Structures", which is incorporated herein by reference in its entirety for all purposes.

STATEMENT REGARDING GOVERNMENTALLY SPONSORED RESEARCH OR DEVELOPMENT

This invention was made with Government support under grant number DEAR0000150 awarded by the U.S. Department of Energy. The government has certain rights in the invention.

BACKGROUND

Material engineering of crystal structures, specifically layered structures, is an important area to create enhanced properties of certain materials for widespread use in many applications like battery electrodes, catalysts, semiconductor devices, thermoelectrics, etc. Immense interest has spurred in these structures in the last few years as a result of the global drive to create sustainable energy generation sources and storage devices. For example, layered cobalt oxides and manganese dioxides (birnessite) are of interest in thermoelectric devices to convert waste heat to electrical energy; layered manganese dioxides, nickel hydroxides, vanadium oxides, etc. are of interest as electrode materials in primary and secondary batteries and as super/pseudo capacitors for electric cars, power-packs or grid-scale applications; layered manganese dioxides and hydrotalcites are of interest as catalysts in oxygen reduction, oxygen evolution reactions, water splitting reactions, etc. to replace the traditionally expensive platinum catalysts.

SUMMARY

In an embodiment, a system and method for forming a metallic ion intercalated layered structure can include a housing, an electrolyte disposed in the housing, a counter-electrode disposed in the housing, and a working electrode disposed in the housing. The working electrode comprises a metallic support; and an electrode paste. The electrode paste can include an active material and a binder.

In an embodiment, a method of forming a layered structure comprises forming an electrochemical cell between a working electrode, a counter electrode, and an electrolyte, passing an electric current through the metallic support, generating metallic ions based on passing the electric current through the metallic support, cycling the working electrode based on passing the current through the metallic support, intercalating the metallic ions into the active material during the cycling of the working electrode, and forming a layered material having the metallic ions intercalated therein based on intercalating the metallic ions into the active material. The working electrode comprises the metallic support and the electrode paste in contact with the metallic support. The electrode paste comprises: an active material, and a binder.

These and other features will be more clearly understood from the following detailed description taken in conjunction with the accompanying claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DESCRIPTION

Figure 1A:
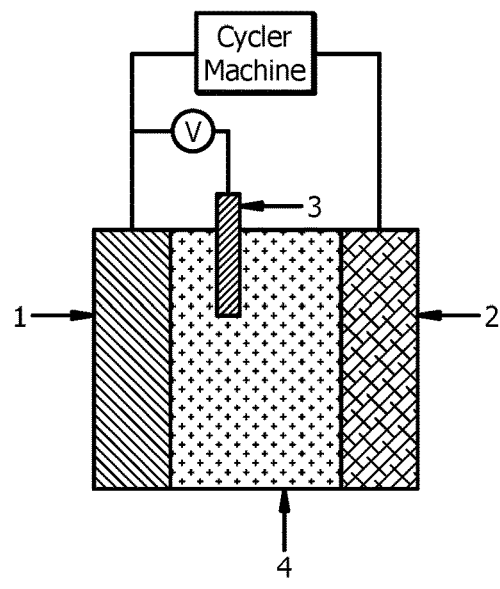
FIGS. 1A-1C describe an embodiment of an electrochemical setup for synthesizing metallic ion intercalated layered structures.

The successful implementation and use of layered structures in commercial devices has faced some impediment as a result of its poor properties like poor conductivity or charge transfer resistance, which is an important property for many of the applications aforementioned. Researchers have tried to mitigate this problem by doping the layered structures of these materials by certain metallic ions like Cu, Al, Co, Sn, Ni, Fe, Mg, Zn, Ag, etc. through complicated synthetic strategies which are generally expensive and not easy to scale-up for commercial purposes.

The present disclosure describes a generalized electrochemical method of synthesizing metallic ion intercalated layered structures. Intercalation of metallic ions into the layered structures is important to develop materials with favorable properties like enhanced charge transfer characteristics and conductivity. An advantage that is realized by the use of this generalized approach is the ease in large scale manufacturability synthesize large quantities of metal intercalated layered structures for use as battery electrodes, catalysts, semiconductor-based devices and other applications where such materials would be useful. The approach described herein is also cost effectiveness compared to traditional wet-chemical synthesis approaches.

The innovative electrochemical method utilizes the redox potentials of the intercalants and a material that can phase transform to a layered structure or the layered material by itself to synthesize a metal-intercalated layered structure that can be used eventually for various applications. An advantage that is realized by using this method is that the synthesis is tunable for time, density of metallic ion intercalants, its safe procedure, its cost effectiveness and remarkable improvement in properties, where such a material is shown in examples as battery cathodes.

In this disclosure an innovative generalized electrochemical method of intercalating metal ions into layered structures for a wide array of applications is described. The source of metallic intercalants can be a metallic support through which an electric current is passed to create metallic ions at their respective redox potentials. The layered structure or a material which undergoes redox reactions to create a layered structure can be in contact with (e.g., pasted onto) the metallic support, where during the passage of current and the generation of metallic ions, the ions can be intercalated into the layered material. An electrolyte can also be used in this electrochemical setup, which could either be a liquid or a solid phase to allow for the presence and generation of electrochemically generated metallic ions and layered structures at their respective redox potentials. In some embodiments, the metallic support or metallic ions can be Cu, Al, Co, Sn, Ni, Fe, Mg, Zn, Ag, and the like. The layered structures or material that generate layered structures can be electrolytic manganese dioxide (EMD), birnessite ($\delta$-MnO$_2$), nickel hydroxide [Ni(OH)$_2$], hydrotalcites, vanadium oxides, molybdenum disulfide (MoS$_2$), Mo$_6$S$_8$ Chevrel-phase compound, chalcogenide compounds like bismuth selenide, graphite, and the like. The electrolyte can be acidic, alkaline, ionic liquid, organic-based, solid-phase, and the like. The applications for such metallic intercalated layered structures can be primary batteries, secondary batteries, bifunctional catalysts for oxygen reduction or evolution reactions, hydrogen evolution reactions, semiconductor applications, solar cells, optoelectronics, thermoelectrics, etc.

A generalized electrochemical setup to synthesize metallic ion intercalated layered structures is also described. A working electrode, counter electrode, reference electrode, electrolyte and power source can be utilized for the electrochemical setup. The counter electrode can be present for the passage of current and to complete the circuit. The reference electrode can be present to monitor the redox potentials of the working electrode in the respective electrolyte. The working electrode contains the metallic support for the generation of the metallic ions and the active material containing the layered structure or a material that also undergoes redox reactions to eventually form the layered structure. An advantage that may be realized by such a method is to create metallic intercalated layered structures with favorable properties like enhanced charge transfer and conductivity of the material, control in the density of intercalants in the layered structure, and ease of large scale manufacturability compared to traditional cumbersome small-batch synthesis methods.

A generalized setup of this electrochemical method is described in FIG. 1. The electrochemical setup comprises a working electrode 1, a counter electrode 2, a reference electrode 3, and an electrolyte 4. The components can be contained in a housing or other container, and power source such as a potentiostat, power supply, cycling machine or the like can be electrically coupled to the working electrode 1, the counter electrode 2, and the reference electrode 3. The reference electrode 3 can be used to monitor the redox potentials of the working electrode 1. If the redox potentials with respect to the counter electrode 2 are known then a reference electrode 3 may or may not be used. However, the use of a reference electrode 3 can be used as its potential with respect to the working electrode 1 can be fixed as it is generally a polarized electrode whereas a counter electrode 2 does not always provide a fixed potential.

Figure 1B:
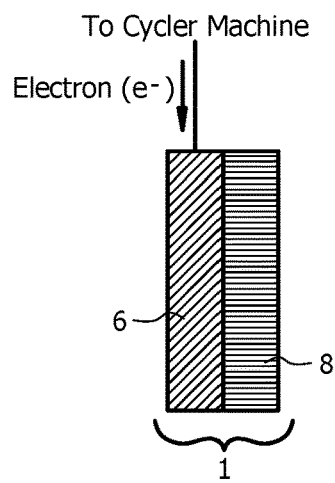

The working electrode 1 can comprise or consist of a metallic support 6 and an electrode paste 8 containing the active material as shown in FIG. 1B. The metallic support 6 can be formed from a metal that is to be intercalated into the layered material. In some embodiments, the metallic support 6 can comprise copper, aluminum, silver, tin, cobalt, magnesium, iron, nickel, zinc, bismuth, or combinations thereof. The metallic support can be configured as a foil, mesh, solid ingot, foam, or in any geometric shape where its surface area to volume ratio can be altered.

The electrode paste 8 can comprise the active material that is to be formed as a layered material with one or more metallic ions intercalated therein. The active material can include a material (e.g., a non-layered material such as EMD, etc.) that is converted to a layered material during the process or a material that is a layered material upon forming the electrode paste. One or more additional components can also be added into the electrode paste. In some embodiments, the electrode paste 8 that is placed on the metallic support can comprise or consist of the active material, a conductive material, and/or a binder. Additional additives can also be optionally used. The active material can be either the layered material, a material that undergoes redox reactions to form the eventual layered material, or a combination thereof. As described in more detail herein, the optional conductive material can be a high surface area material like carbon or any conductive material. The optional binder, which may or may not be used, could be TEFLON or water-based. In some embodiments, the electrode paste 8 contents can be 1-100 wt. % active material, 0-99 wt. % conductive material, and remaining binder.

The active materials present in the electrode paste 8 can be layered structures or materials that are converted into layered structures through redox reaction. For example, one or many polymorphs of MnO$_2$, including electrolytic (EMD), $\alpha$-MnO$_2$, $\beta$-MnO$_2$, $\gamma$-MnO$_2$, $\delta$-MnO$_2$, $\varepsilon$—MnO$_2$, $\lambda$-MnO$_2$, and/or chemically modified manganese dioxide, nickel hydroxide [Ni(OH)$_2$], vanadium oxides, molybdenum disulfide (MoS$_2$), Mo$_6$S$_8$ Chevrel-phase compound, chalcogenide compounds like bismuth selenide, transition metal dichalcogenides, graphite, layered clays like kaolinite, dickite, halloysite, nacrite, montmorillonite, nontronite, beidellite, saponite, smectite, illite, sepiolite, attapulgite, clinochlore, chamosite, nimite, pennantite, baileychlore, chamosite, cookeite, donbassite, gonyerite, odinite, orthochamosite, ripidolite, sudoite, compounds with brucite structure, compounds with buserite structure, hydrotalcites with a general formula like $[Mu^{II}_{1-x}M^{III}_{x}(OH)_2]^{x+}[A^{n-}_{x/n} \cdot mH_2O]^{x-}$, where M can be Zn, Ni, Fe, Co, Cu, Mg, Mn, Al, Fe, In, Ga, Cr, or a combination thereof, and where $A^{n-}$ can be $ClO_4^-$, $Cl^-$, $NO_3^-$, or $SO_4^{2-}$, or any combinations thereof.

The electrode paste 8 can optionally contain additives that help maintain the layered structure through the electrochemical process. These additives can be bismuth oxide, lead oxide, cobalt oxide, bismuth hydroxide, cobalt hydroxide, copper hydroxide, and combinations thereof. The wt. % of the layered structure or material that converts to the layered structure can be adjusted with the additives through keeping the molar ratio of the layered structure or material that converts to the layered structure and the additive between 0 to 40.

In some embodiments, a conductive additive can be present in the electrode paste 8. The conductive additive can be present in a concentration between about 1-99 wt. %. Example of conductive carbon include single walled carbon nanotubes, multiwalled carbon nanotubes, graphene, carbon blacks of various surface areas, and others that have specifically very high surface area and conductivity. The conductive material can also be TIMREX® Primary Synthetic Graphite (all types), TIMREX® Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX® Dispersions; ENASCO 150 G, 210 G, 250 G, 260 G, 350 G, 150 P, 250 P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), graphene, graphyne, graphene oxide, Zenyatta graphite, nanowires of copper, nickel and silver, carbon nanotubes plated with nickel and combinations thereof.

In some embodiments, the conductive additive can have a particle size range from about 1 to about 50 microns, or between about 2 and about 30 microns, or between about 5 and about 15 microns. The total conductive additive mass percentage in the cathode material 2 can range from about 5% to about 99% or between about 10% to about 80%. In some embodiments, the electroactive component in the cathode material 2 can be between 1 and 99 wt. % of the weight of the cathode material 2, and the conductive additive can be between 1 and 99 wt. %.

In some embodiments, a binder can be used with the electrode paste. The binder can be present in a concentration of between about 0-10 wt. %. In some embodiments, the binder comprises water-soluble cellulose-based hydrogels, which can be used as thickeners and strong binders, and have been cross-linked with good mechanical strength and with conductive polymers. The binder may also be a cellulose film sold as cellophane. The binders can be made by physically cross-linking the water-soluble cellulose-based hydrogels with a polymer through repeated cooling and thawing cycles. In some embodiments, the binder can comprise a 0-10 wt. % methyl cellulose (MC) and/or carboxymethyl cellulose (CMC) solution cross-linked with 0-10 wt. % polyvinyl alcohol (PVA) on an equal volume basis. The binder, compared to the traditionally-used PTFE, shows superior performance. PTFE is a very resistive material, but its use in the industry has been widespread due to its good rollable properties. This, however, does not rule out using PTFE as a binder. Mixtures of PTFE with the aqueous binder and some conductive carbon can be used to create rollable binders. Using the aqueous-based binder can help in achieving a significant fraction of the two electron capacity with minimal capacity loss over many cycles. In some embodiments, the binder can be water-based, have superior water retention capabilities, adhesion properties, and help to maintain the conductivity relative to an identical cathode using a PTFE binder instead. Examples of suitable water based hydrogels can include, but are not limited to, methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose, hydroxyethyl cellulose (HEC), sodium alginate, styrene-butadiene rubber, polyvinylidene fluoride, and combinations thereof. Examples of crosslinking polymers include polyvinyl alcohol, polyvinylacetate, polyaniline, polyvinylpyrrolidone, polyvinylidene fluoride, polypyrrole, and combinations thereof. In some embodiments, a 0-10 wt. % solution of water-cased cellulose hydrogen can be cross linked with a 0-10 wt. % solution of crosslinking polymers by, for example, repeated freeze/thaw cycles, radiation treatment, and/or chemical agents (e.g. epichlorohydrin). The aqueous binder may be mixed with 0-5% PTFE to improve manufacturability.

In some embodiments, a separator can be disposed between the working electrode 1 and the counter electrode 2. In some embodiments, a separator can be used to wrap one or more of the working electrode 1 and/or the counter electrode 2. The separator is optional and may not be present in all instances. For example, when a non-interacting counter electrode 2 is present, a separator may not be needed.

When present, the separator may comprise one or more layers. For example, when the separator is used, between 1 to 5 layers of the separator can be applied between the working electrode 1 and the counter electrode 2. The separator can be formed from a suitable material such as nylon, polyester, polyethylene, polypropylene, poly(tetrafluoroethylene) (PTFE), poly(vinyl chloride) (PVC), polyvinyl alcohol, cellulose, or any combination thereof. Suitable layers and separator forms can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified" refers to a material whose contact angle with water is less than 45°. In another embodiment, the contact angle with water is less than 30°. In yet another embodiment, the contact angle with water is less than 20°. The polyolefin may be modified by, for example, the addition of TRITON X-100™ or oxygen plasma treatment. In some embodiments, the separator 9 can comprise a CELGARD® brand microporous separator. In an embodiment, the separator 9 can comprise a FS 2192 SG membrane, which is a polyolefin nonwoven membrane commercially available from Freudenberg, Germany. In some embodiments, the separator can comprise a lithium super ionic conductor (LISICON®), sodium super ionic conductions (NASICON), NAFION®, a bipolar membrane, water electrolysis membrane, a composite of polyvinyl alcohol and graphene oxide, polyvinyl alcohol, crosslinked polyvinyl alcohol, or a combination thereof.

The electrolyte can be acidic, alkaline, neutral, ionic liquids, and/or organic-based electrolytes in the form of a liquid, solid-phase, gelled, or combinations thereof. Examples include chlorides, sulfates, hydroxides (e.g., potassium hydroxide, sodium hydroxide, lithium hydroxide, etc.), perchlorates, lithium hexafluorophosphate, 1-ethyl-3-methylimidazolium bis (trifluoromethylsulfonyl)imide, 1-ethyl-3-methylimidazolium trifluoromethanesulfonate, 1-butly-1-methylpyrrolidinium bis(trifluoromethylsulfonyl) imide,1-hexyl-3-methylimidazolium hexofluorophosphate, 1-ethyl-3-methylimidazolium dicyanamide,11-methyl-3-octylimidazolium tetrafluoroborate, yttria-stabilized zirconia, beta-alumina solid, silver iodide, polyacrylamides, agar, NASICON, and combinations thereof.

The electrode paste 8 can be adhered to the metallic support on the working electrode 1 by pressing at, for example, a pressure between 1,000 psi and 20,000 psi (between $6.9 \times 10^6$ and $1.4 \times 10^8$ Pascals). A tab of the metallic support can extend outside of the device to serve as an electrical connection during the cycling of the working electrode 1.

The counter electrode 2 can be formed from a non-interacting material or an interacting material. A material that interacts with the working electrode 1 through chemical or electrochemical means is termed an interacting material. A material that does not interact with the working electrode 1 through chemical or electrochemical means is termed a non-interacting material. Counter electrodes 2 formed from non-interacting materials like platinum, nickel (e.g., a nickel gauze, sintered nickel, etc.), and the like can be used in some embodiments. Counter electrodes 2 formed from interacting materials like zinc, cadmium, lithium, aluminum, magnesium, potassium, sodium, etc. can be used as well in some embodiments. Non-interacting counter electrodes 2 may be preferred in some embodiments and with some layered material compositions.

The electrochemical cell can then be constructed as shown in FIG. 1A prior to cycling the working electrode to form the layered material with the metallic ions layered therein. The electrochemical setup comprises a working electrode 1, a counter electrode 2, a reference electrode 3, and an electrolyte 4 as shown in FIG. 1B.

The electrochemical cell can then be used to perform a method of intercalating metal ions into layered structures. Once constructed, an electric current can be passed through the metallic support of the working electrode against the counter electrode. Metallic ions can then be created in response to the electric current at the metal's respective redox potentials. When the electric current is applied, the layered structure or the material which undergoes redox reactions to create a layered structure can be in contact with (e.g., pasted onto) the metallic support, and during the passage of the electric current and the generation of metallic ions, the ions can be intercalated into the layered material.

Figure 1C:
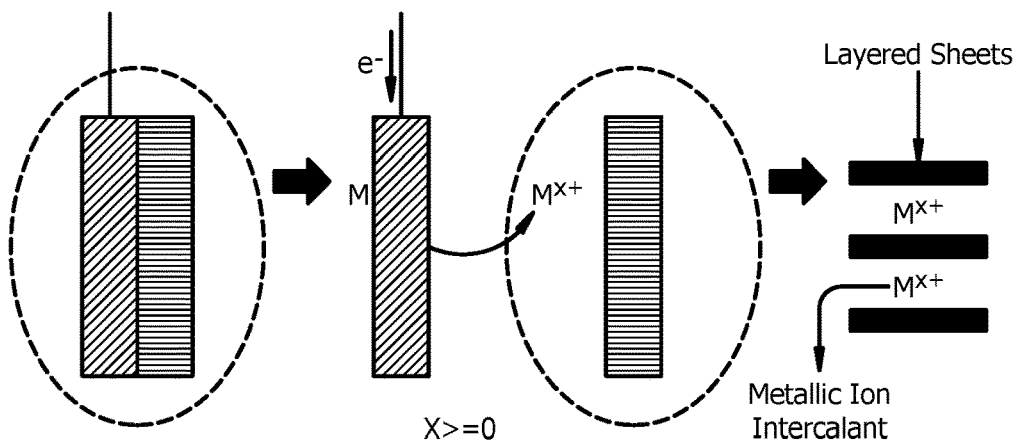

The process is shown schematically in FIG. 1C. As illustrated, the passing of the electric current through the metallic support can generate the metal ions $M^{x+}$. The electrode paste can either comprise a layered material and/or the passing of current through the material can cause the active material to form a layered material. During this process, the metallic ions can be arranged between the layers of the active material. As shown in FIG. 1C, the layers of the active material can be spaced, and the metallic ions can be inserted between the adjacent sheets. When disposed between the layered sheets, the metallic ions can be said to be intercalated between the layered sheets.

Any suitable potential windows for the application of the electric current can be used, and the potential windows will be based, at least in part, on the composition of the metallic support and the composition of the active material. For example, the electrochemical cell can be cycled between 0.4V and −1V vs Hg/HgO in order to complete the conversion step. In some embodiments, the electrochemical window can also be between 0.45V and −1.3V vs Hg/HgO to trigger redox reactions of some supports. As used herein, cycling refers to alternating between charging and discharging cycles in order to cause the conversion and restoration of the active materials in the presence of the metallic ions. As noted above, the conversion of certain active materials on discharge may not result in the reformation of the same material on a recharge cycle. Rather, a non-layered material may be converted into a layered material in the presence of the metallic ions with discharging and charging cycles.

As an example, the active material can comprise a non-layered material such as EMD. Upon cycling using a metallic support such as copper, tin, and/or cobalt, the EMD may be discharged to the end of the $2^{nd}$ electron stage for the manganese dioxide, and upon charging may form birnessite, which is a layered structure. The presence of the metallic ions can then form an intercalated birnessite where the ions from the metallic support can be intercalated within the layers of the birnessite.

The specific charging protocols used including the potential windows, the depth of discharge, and the number of discharge and charging cycles can be used to tune the density or amount of metallic ion intercalants placed within the active material. In general, the higher the number of cycles, the higher the metallic ion density within the active materials.

Further, other materials present in the electrode paste can also be intercalated during the cycling process. For example, the various additives can also form ions that can be intercalated into the layered material as part of the cycling process. Thus, the ability to include additives in the electrode paste along with the selection of the material for the metallic support can result in a specific composition of the intercalant within the layered structures.

Once the layered materials are formed on the metallic support, the resulting electrode (e.g., the active material and other components on the metallic support that can act as a current collector) can be used directing in a battery or cell. In some embodiments, the resulting electrode can be removed from the production system and placed in a separate battery or cell along with a different counter electrode and electrode to form a battery. One or more separators, including any of those described herein, can be used between the electrode with the layered material and intercalants and the counter electrode as part of the formation of the cell.

In some embodiments, the resulting material may be removed from the metallic support and processed for further uses. As an example, the entire resulting electrode can be removed from the system, and the active material with the layered material having the metallic ions intercalated therein can be removed from the metallic support, for example, by scraping, grinding, or otherwise removing the active material layer. The metallic support can then be reused in some instances. The removed active material can be processed such as by being milled, ground, sieved, or otherwise processed into a workable material. The resulting material can then be used for other purposes. For example, the removed material can be reformed as a paste and used to make a separate electrode with a new current collector. The resulting electrode can then be used in a battery as described above.

The process described herein may then allow for large scale production of a layered material having desired intercalants disposed between the layers of the material. The resulting material can then be removed and used in separate cells, where a single working electrode may be used to produce material for multiple other electrodes in other batteries or as a material for other uses.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

In example 1 a metallic copper (Cu), tin (Sn), mix of copper and tin (Cu—Sn) and cobalt were used as supports in four different cells (shown in FIG. 2). The electrode paste on the working electrode consisted of 60 wt. % electrolytic manganese dioxide (EMD), 12 wt. % bismuth oxide ($Bi_2O_3$) and 28 wt. % carbon nanotubes. Sintered nickel was used as the non-interacting counter electrode. 25 wt. % potassium hydroxide (KOH) was used as the alkaline electrolyte. To measure the redox potentials of the working electrode a mercury/mercury oxide (Hg/HgO) was used as the reference electrode. EMD is not a layered material; however, it is a material that can be converted to layered-phase birnessite (δ-$MnO_2$) through its redox reactions. Bismuth oxide ($Bi_2O_3$) was used as the additive in this example to aid EMD in the conversion to birnessite and maintain the layered structure. The electrochemical cell was cycled between 0.4V and −1V vs Hg/HgO to go through its complete conversion step. The electrochemical window can also be stretched to 0.45V and −1.3V vs Hg/HgO to trigger redox reactions of other metallic supports. As an example of application of these structures they are used as battery cathodes to access the $2^{nd}$ electron capacity (617 mAh/g) of manganese dioxide ($MnO_2$).

Figure 2A:
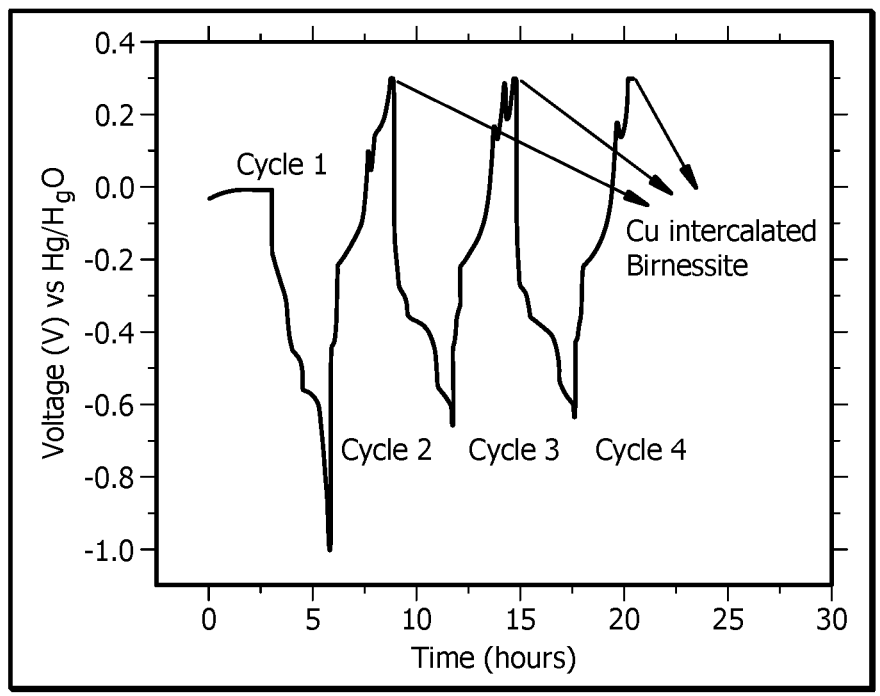
FIGS. 2A-2F describe the examples of synthesizing Cu, Sn, Cu—Sn and Co intercalated layered structures as described in Example 1.
Figure 2B:
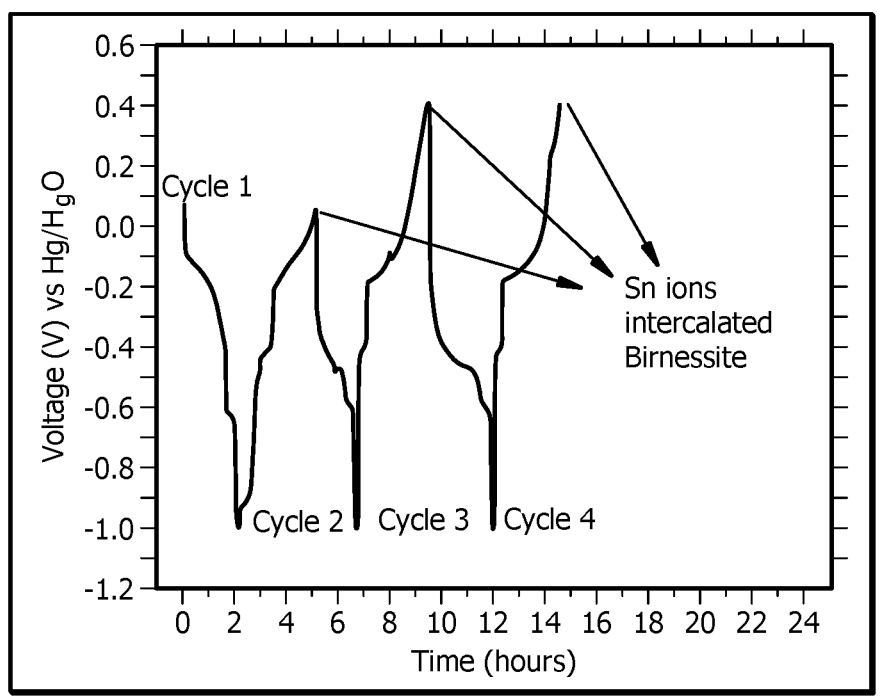
Figure 2C:
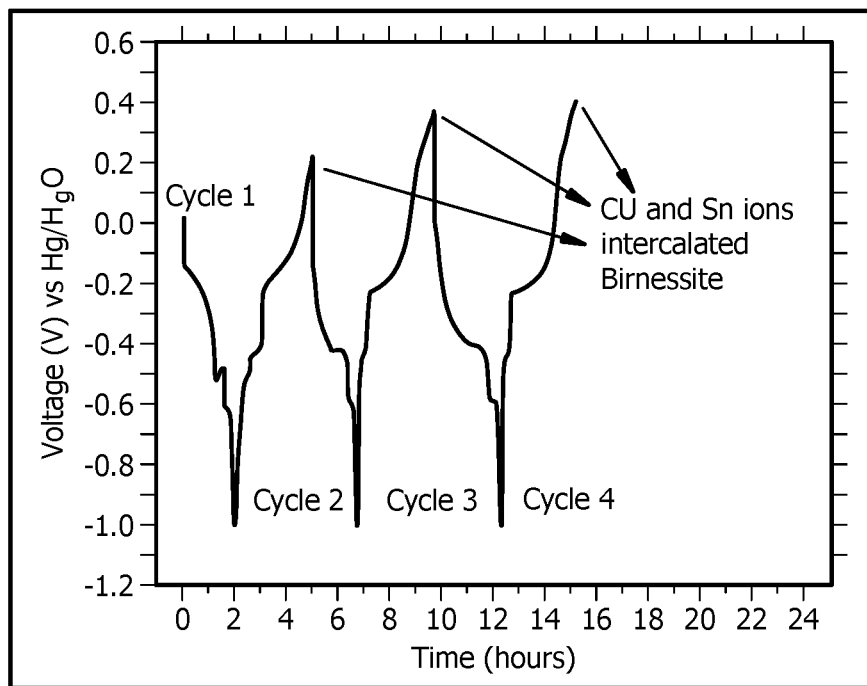
Figure 2D:
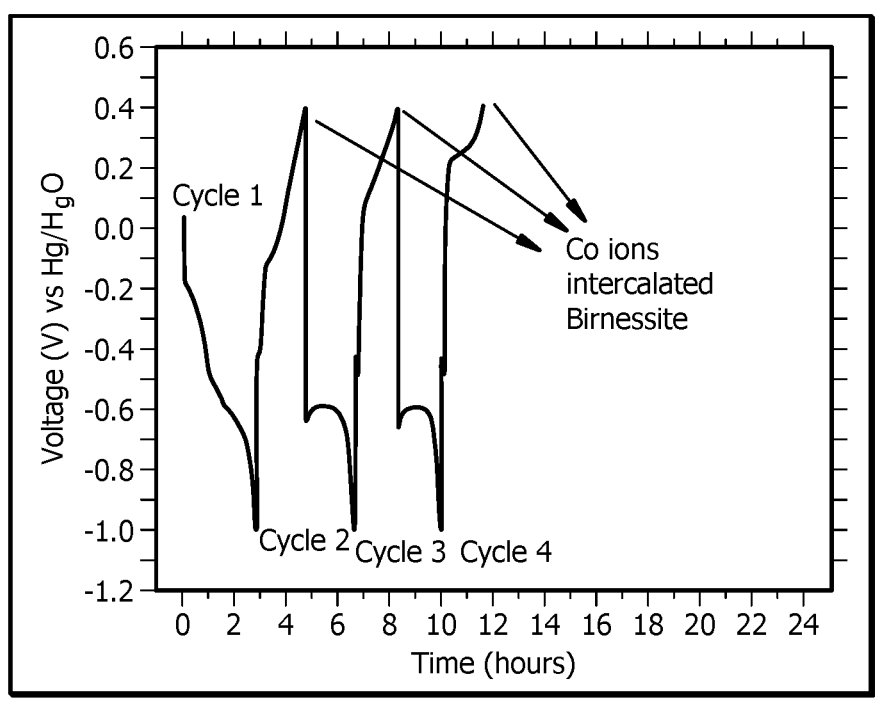
Figure 2E:
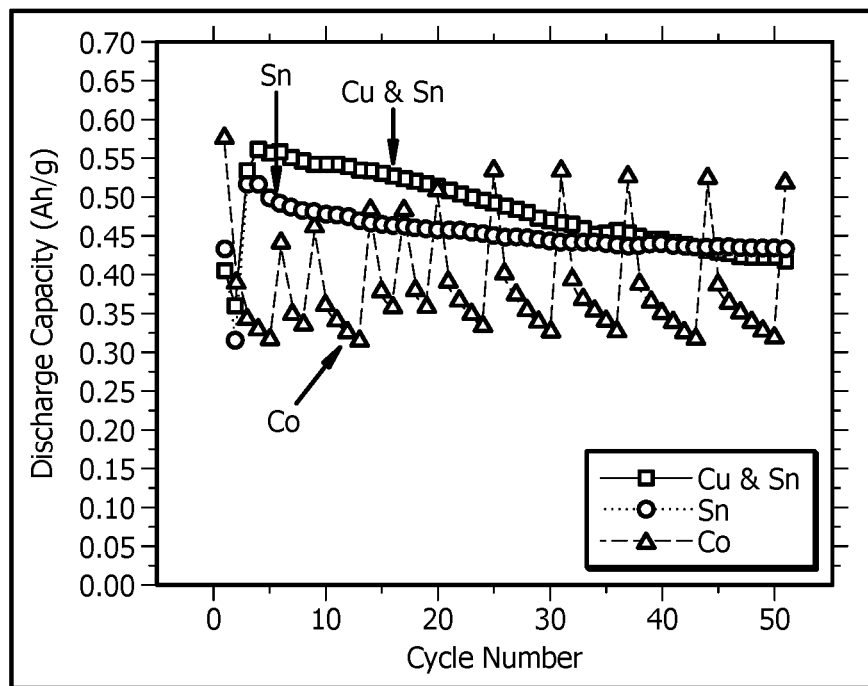
Figure 2F:
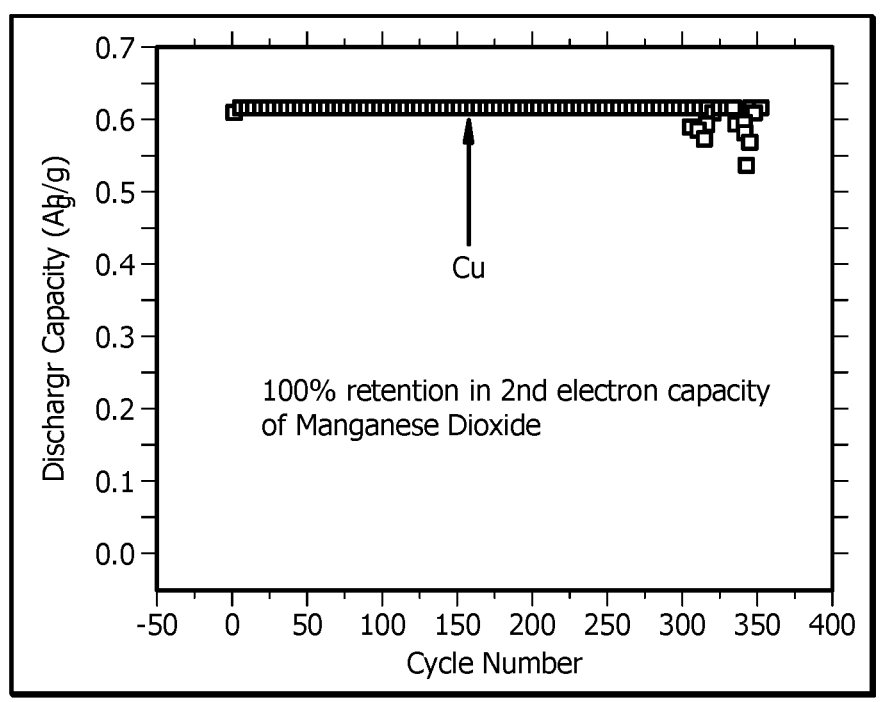

FIGS. 2A, 2B, 2C and 2D show the voltage-time characteristics of the four different cells with different metallic supports. All the cells were stopped on the charged state (~0.4V vs Hg/HgO) by cycle 4 as it signifies the redox potential at which manganese dioxide or the birnessite layered phase is formed in alkaline conditions. As EMD was used as the starting material, the $1^{st}$ cycle discharge showed sigmoidal characteristics of an EMD material. After charge on the $2^{nd}$ cycle, the characteristic layered phase birnessite was formed with the respective metallic ion intercalated within its interlayers. The cell can be stopped at this point. However, for the purposes of this example the cells were stopped at cycle 4 to demonstrate the reversibility of the voltage-time curves that show the characteristic birnessite charge and discharge curves. The density of the metallic ion intercalants increase with increasing cycle number. The redox reactions of the metallic supports are within the 0.4V and −1V range. FIGS. 2E and 2F show the battery cycling capacity of these metallic ion intercalated birnessites. The cells were cycled to obtain the $2^{nd}$ electron capacity of manganese dioxide or birnessite (~617 mAh/g). Intercalating Cu ions within the birnessite layers is the best as it delivers 100% of the $2^{nd}$ electron capacity as shown in FIG. 2F. Intercalating the birnessite layers with Sn, Cu and Sn and Co ions deliver around 50-90% of the $2^{nd}$ electron capacity. A birnessite electrode without any intercalants would fail within 2-3 cycles at high mass and areal loadings. The valence state of the intercalants is greater than or equal to 0.

Example 2

In example 2 a layered structure of manganese dioxide (birnessite) was synthesized through hydrothermal synthesis. In the hydrothermal synthesis a well-mixed mixture of potassium permanganate and manganese sulfate solution was sealed in a Teflon container and heated at 160° C. for 12 hours in an oven. The final product was washed with DI water and dried to form birnessite. 45 wt. % birnessite, 9 wt. % bismuth oxide and 46 wt. % carbon nanotubes was used as the electrode paste and pressed on metallic copper support. Sintered nickel was used as the counter electrode. 25 wt. % KOH and Hg/HgO were used as the electrolyte and reference electrode, respectively. The cell was cycled between 0.3V and −1V vs Hg/HgO. As an example of application of these structures they are used as battery cathodes to access the $2^{nd}$ electron capacity of $MnO_2$.

Figure 3A:
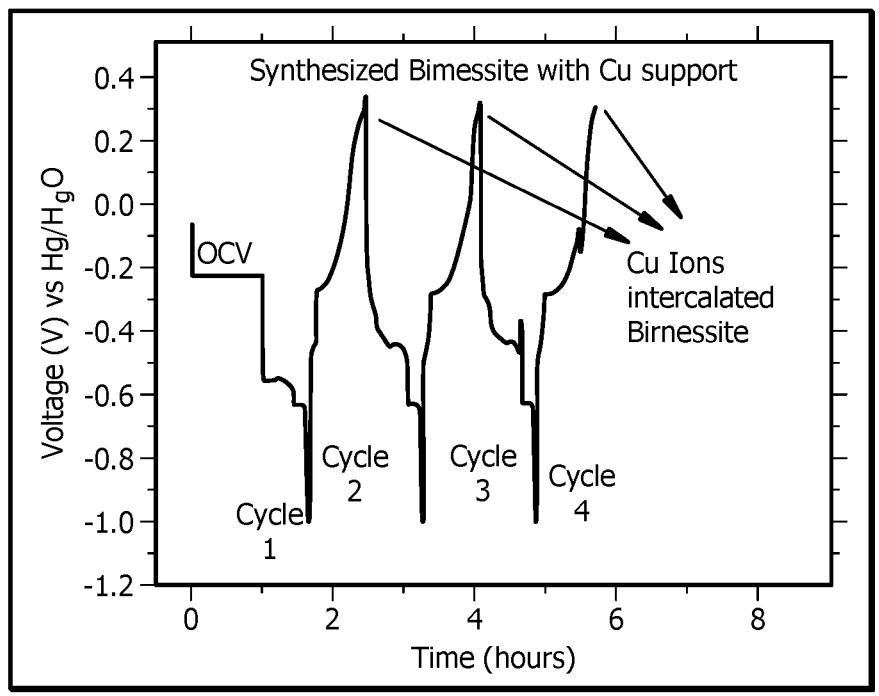
FIGS. 3A-3B describe the example of birnessite ($\delta$-$MnO_2$) intercalated with Cu ions as described in Example 2.
Figure 3B:
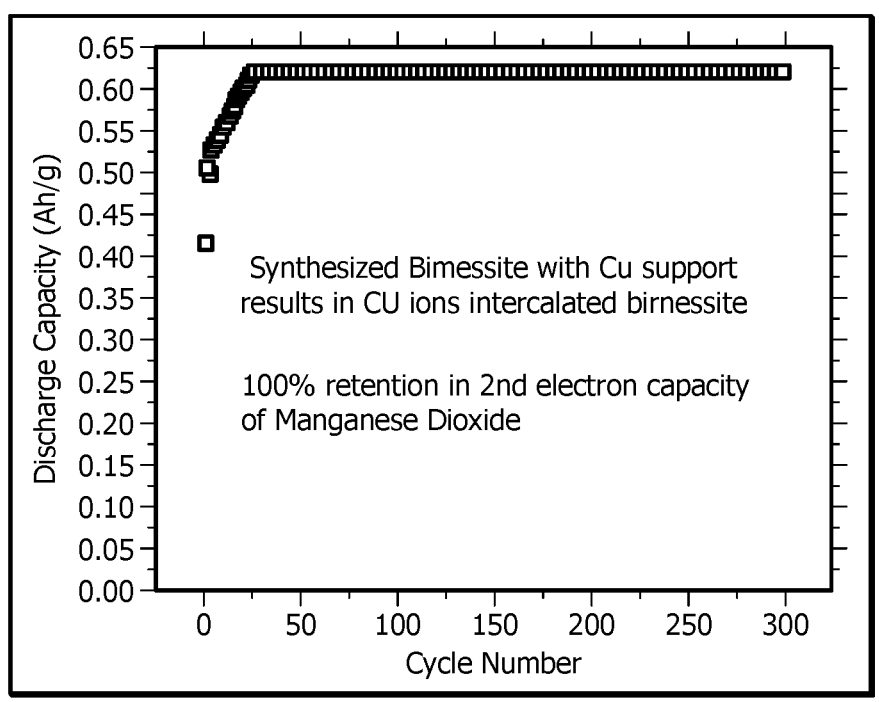

FIG. 3A shows the voltage-time curves of example 2. The characteristic curves of the birnessite are shown in cycle 1. The cell was stopped as cycle 4 on charge to indicate Cu ions intercalated into the layers of birnessite. The similarity of the curves are seen between examples 1 and 2, which show the characteristic birnessite curves when starting from the layered material (birnessite) itself or a material (EMD) that gets converted to the layered material through its redox reactions. FIG. 3B shows the discharge performance of the synthesized birnessite with Cu support. 100% retention in capacity is also obtained through this method.

Example 3

In example 3 a large-scale electrochemical cell was used to synthesize Cu ions intercalated birnessite. An electrode paste consisting of 60 wt. % EMD, 12 wt. % $Bi_2O_3$ and 28 wt. % carbon nanotubes was pasted on a metallic copper support. Zinc was used as the counter electrode. 25 wt. % KOH was used the electrolyte. Zinc in this case is an example of an interacting counter electrode. Zinc dissolves in alkaline electrolyte to form zincate ions (dissolved Zn ions) during its redox process. In some cases it could happen that dissolved Zn ions interact with the birnessite to form a mixture of Zn and Cu intercalated birnessite. This setup is an example of a battery system as well as $MnO_2$/Zn are common battery systems. Around 113 g of EMD was used in this cell to synthesize large quantities of Cu intercalated birnessite.

Figure 4A:
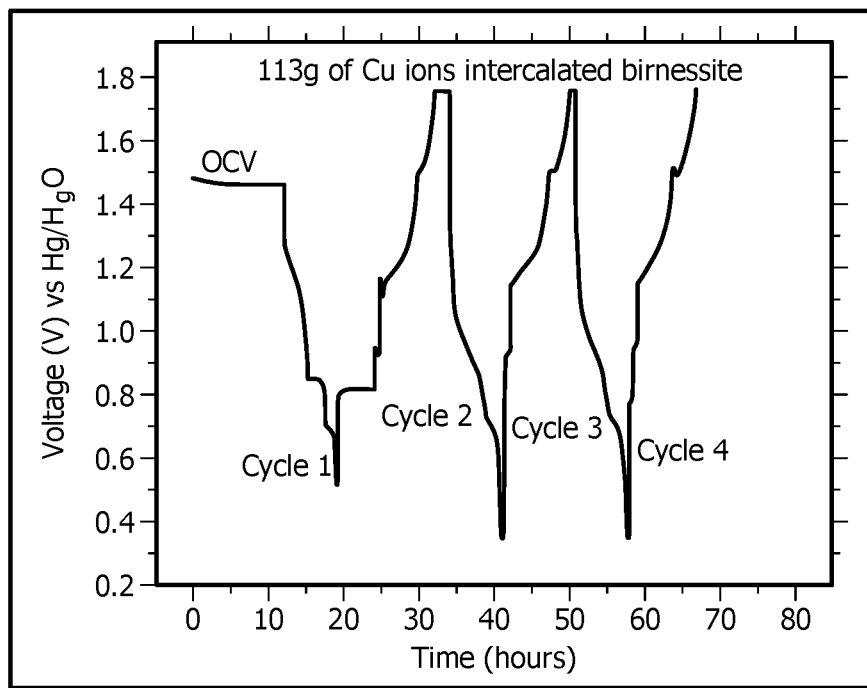
FIGS. 4A-4B describe a large-scale method of synthesizing Cu intercalated birnessite as described in Example 3.
Figure 4B:
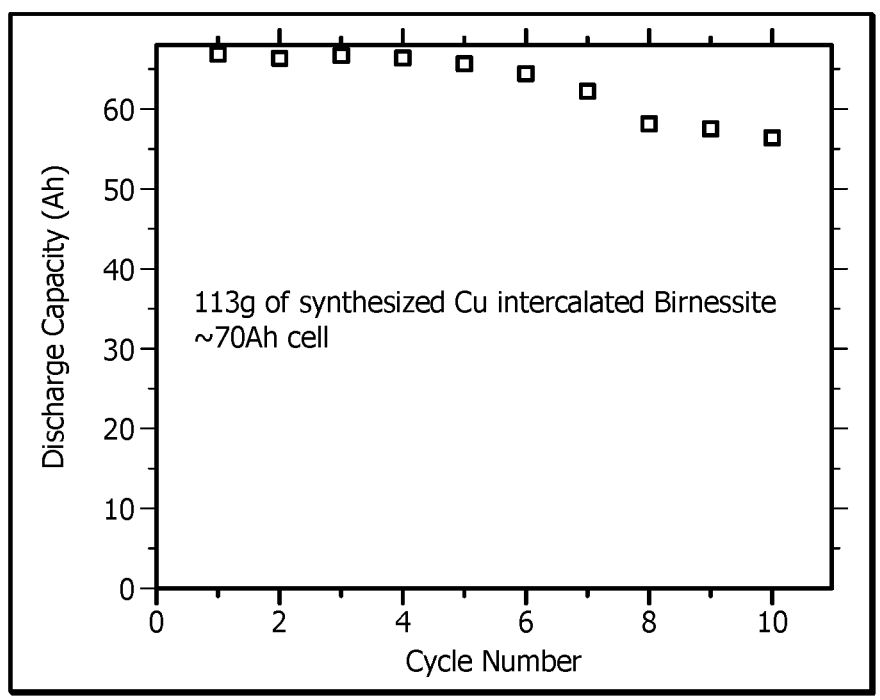
Figure 1A:
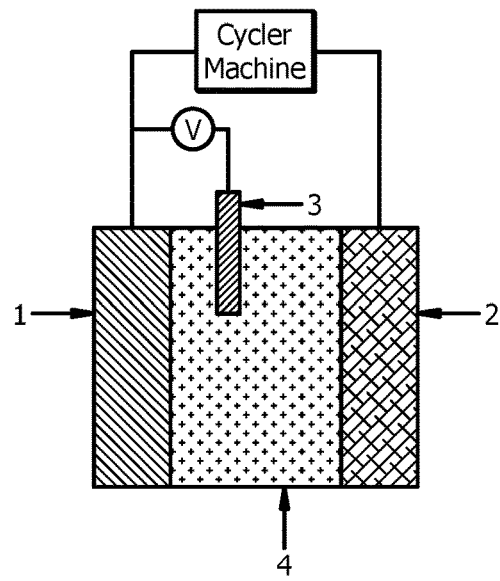
Figure 1B:
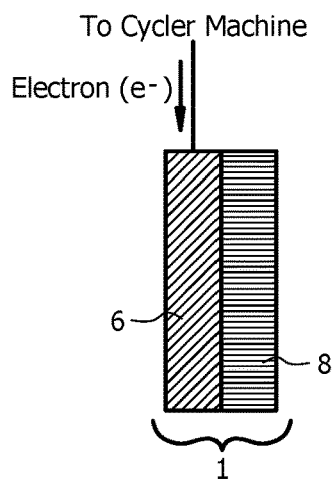
Figure 1C:
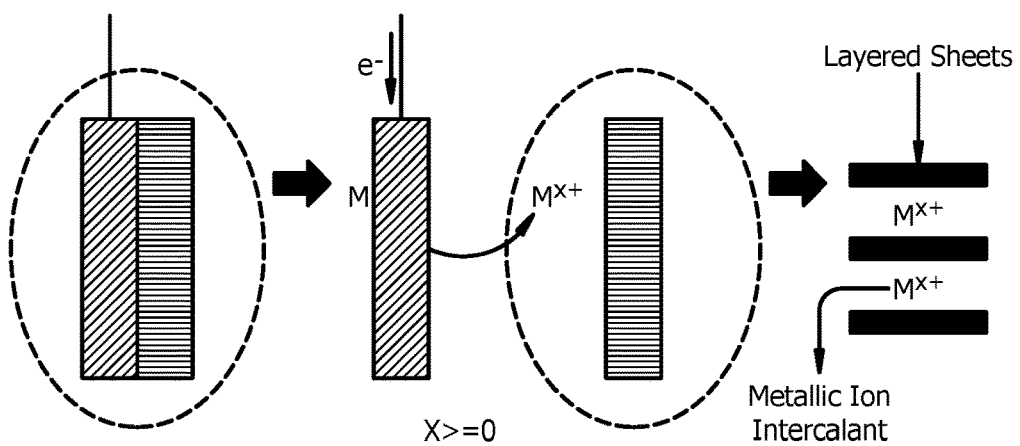
Figure 2A:
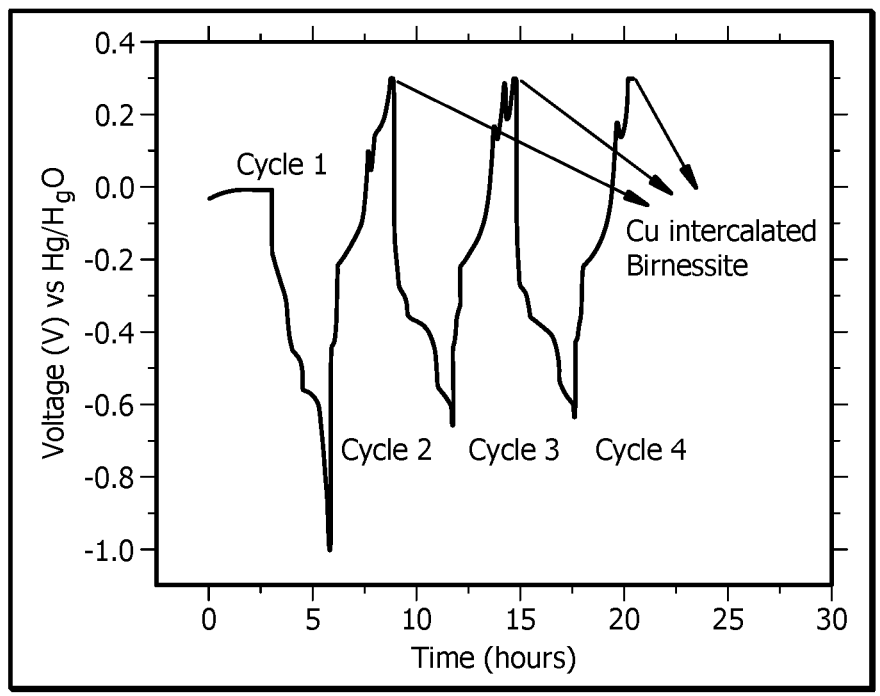
Figure 2B:
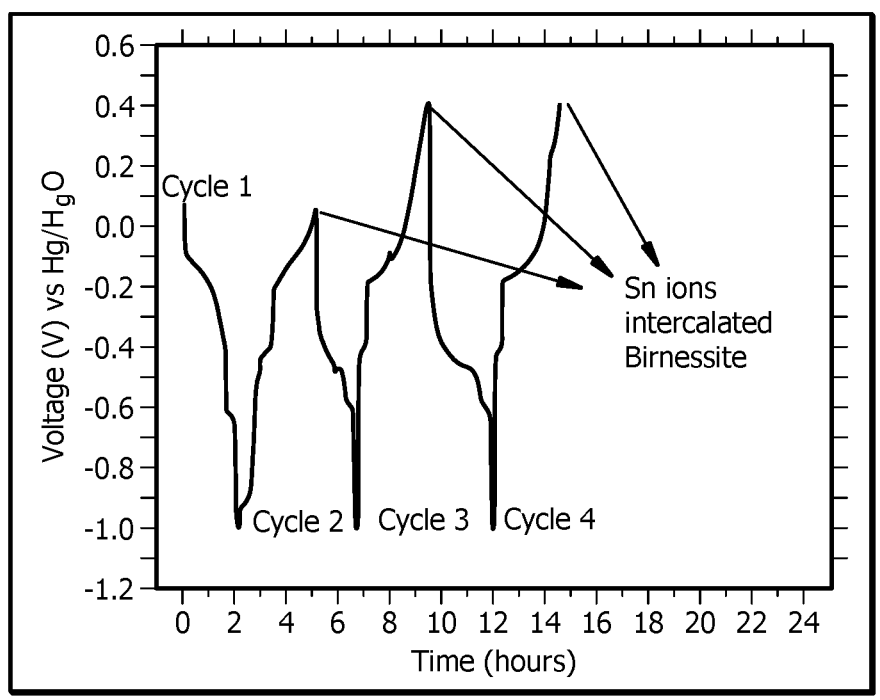
Figure 2C:
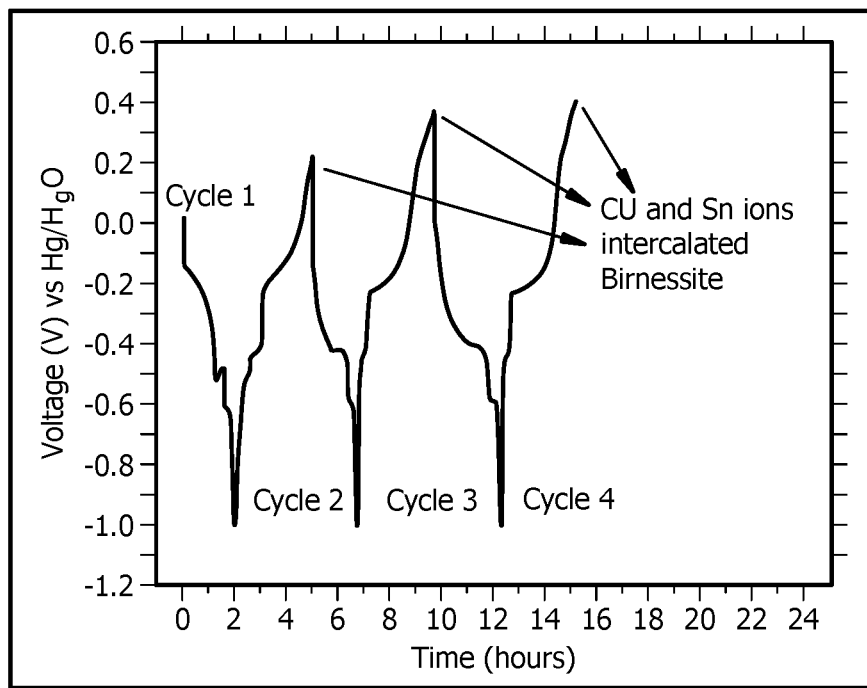
Figure 2D:
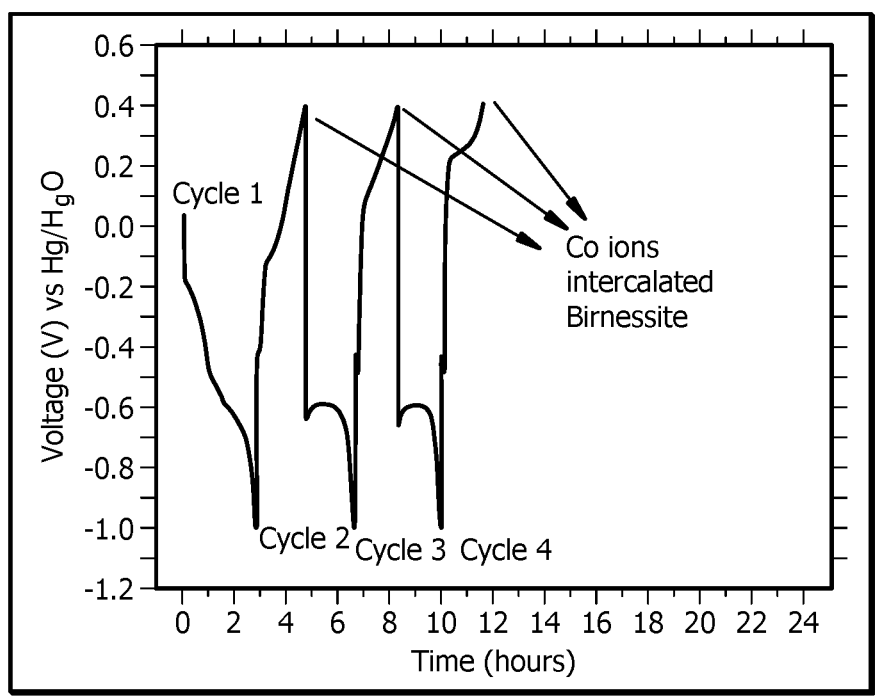
Figure 2E:
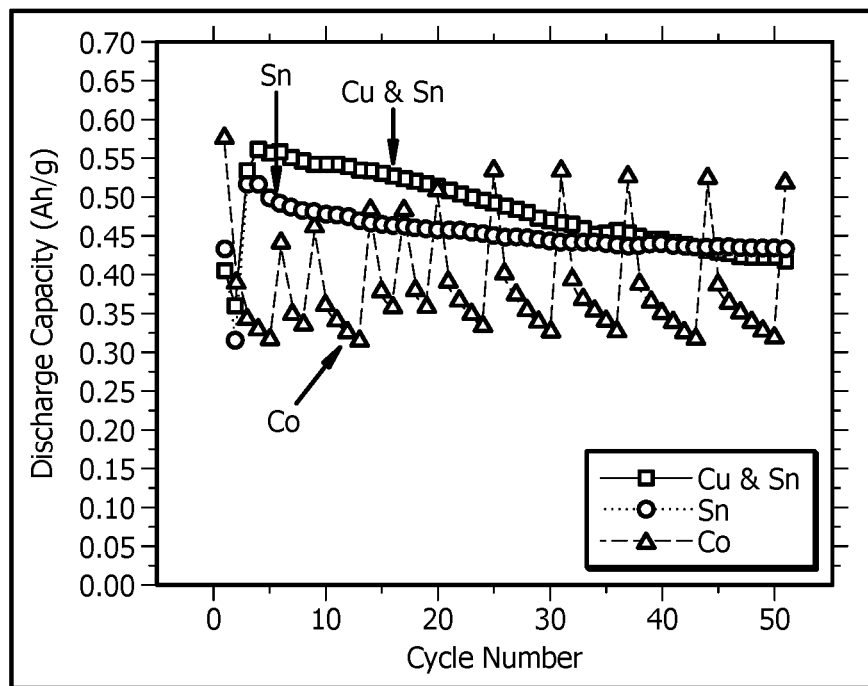
Figure 2F:
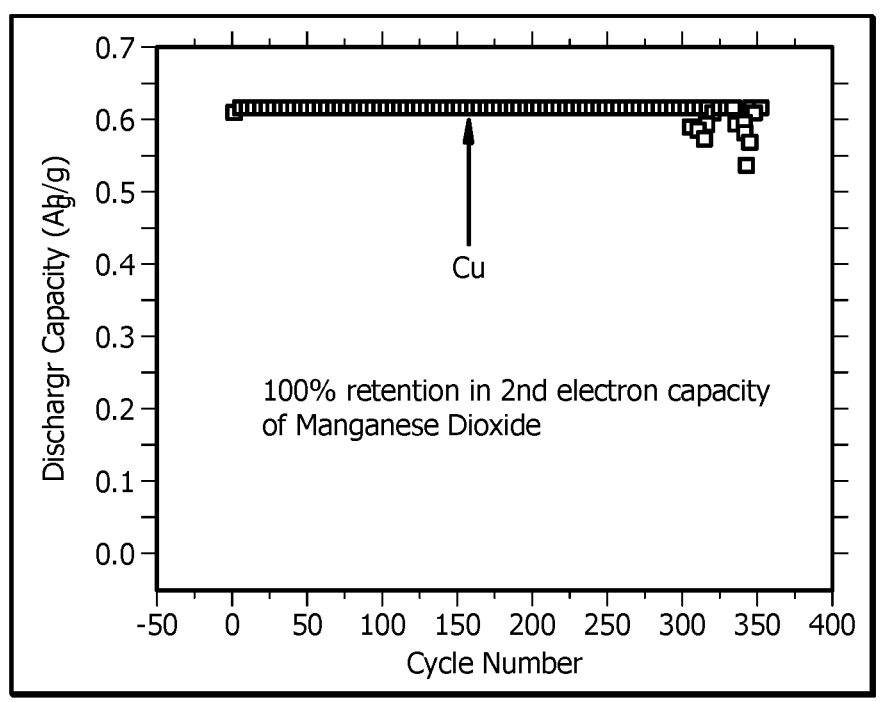
Figure 3A:
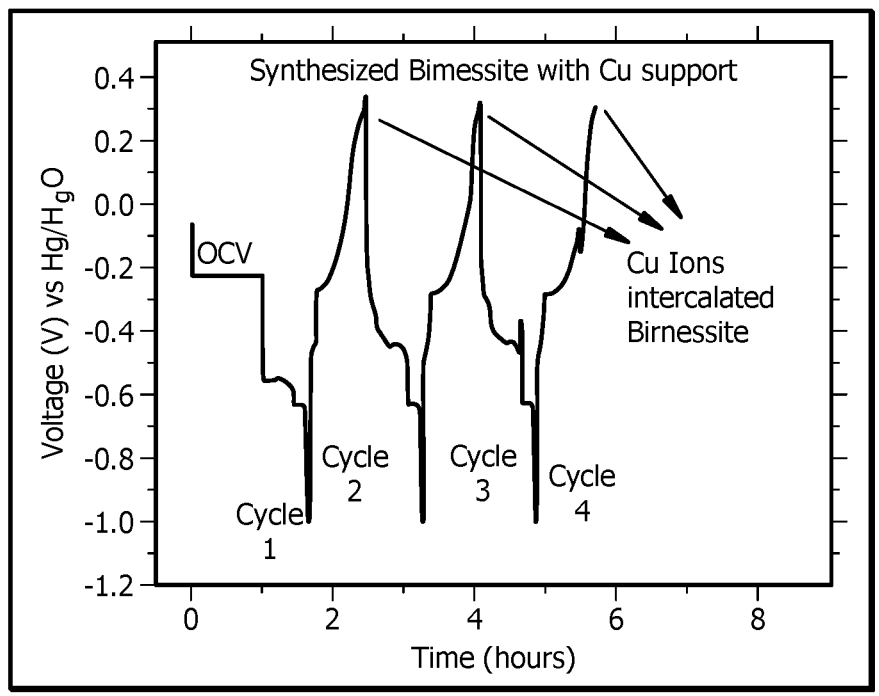
Figure 3B:
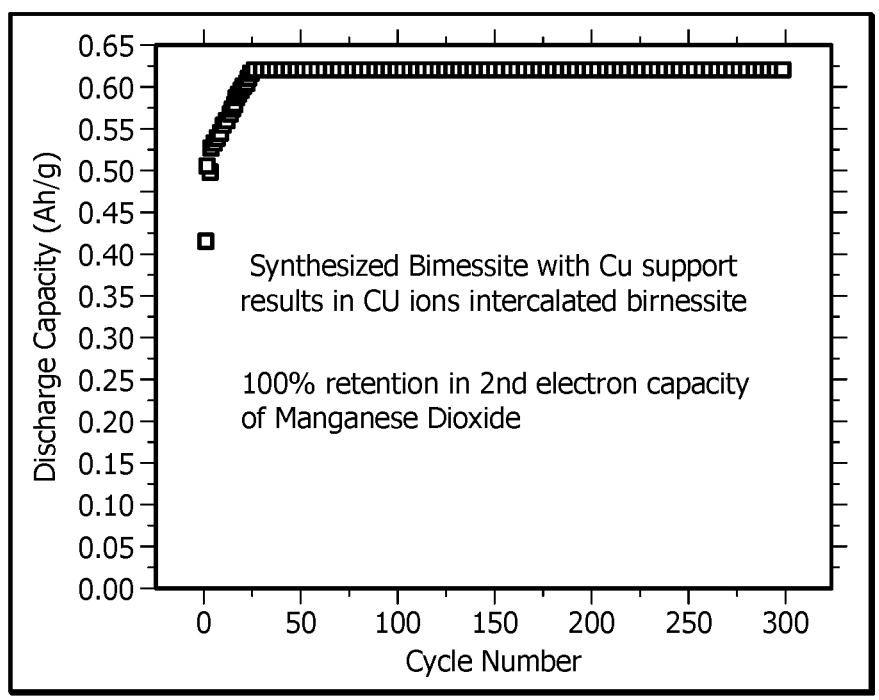
Figure 4A:
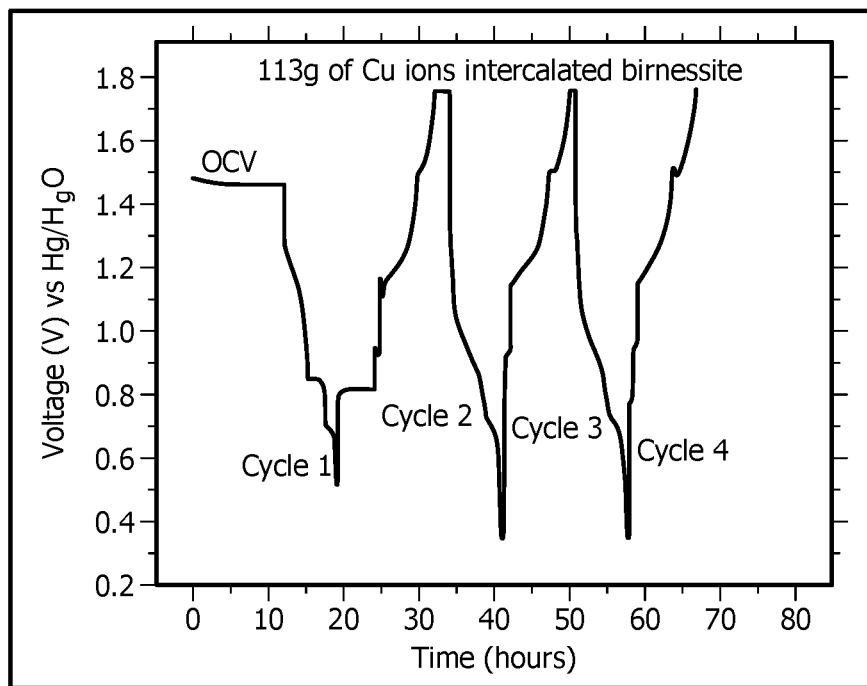
Figure 4B:
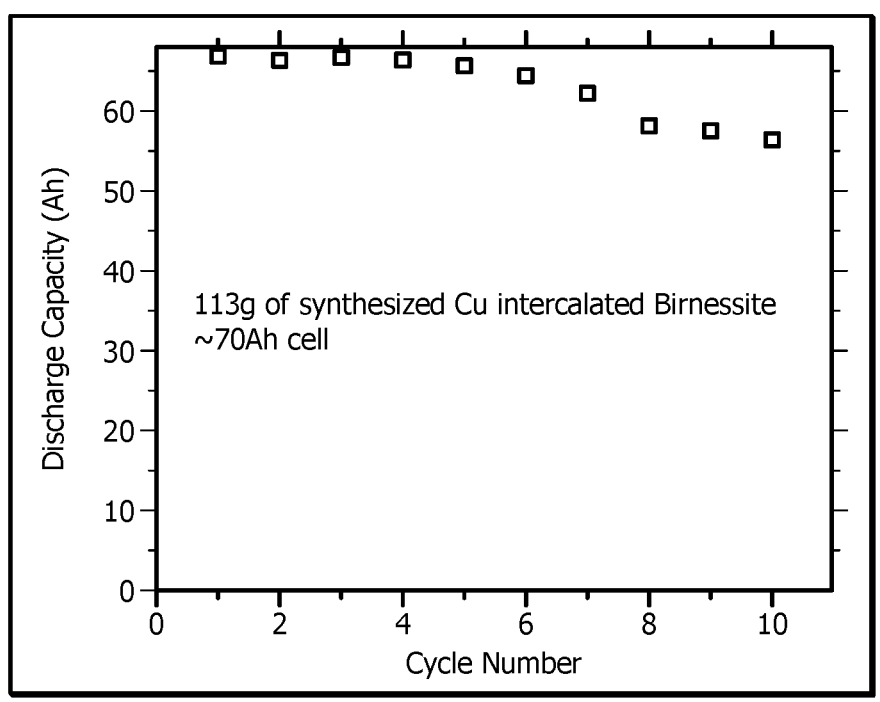

FIG. 4A shows the voltage-time curves for the large scale electrochemical cell. The curves are remarkably reversible even for a large weight of EMD used in the cell. The cell was stopped at cycle 4 again to indicate Cu ions intercalated within the birnessite layers. As Zn was used as the anode it could be in some cases that Zn also intercalates within the layers of the birnessite. This is the first demonstration of such a method to mass produce large quantities of metallic ions intercalated within layered structures. Also, a battery of this size was tested, where 113 g of EMD equate to ~70 Ah. FIG. 4B shows the discharge capacity stability of this large cell.

Having described various batteries, systems, and methods, specific aspects can include, but are not limited to:

In a first aspect, a system for forming a metallic ion intercalated layered structure comprises: a housing; an electrolyte disposed in the housing; a counter-electrode disposed in the housing; a working electrode disposed in the housing, wherein the working electrode comprises: a metallic support; an electrode paste comprising: an active material; and a binder.

A second aspect can include the system of the first aspect, wherein the electrolyte is one of an acidic electrolyte, an alkaline electrolyte, an ionic liquid electrolyte, an organic-based electrolyte, a solid-phase electrolyte, a gelled electrolyte, or a combination thereof.

A third aspect can include the system of the first or second aspect, wherein the electrolyte is one of a chloride, a sulfate, potassium hydroxide, sodium hydroxide, lithium hydroxide, perchlorates, lithium hexafluorophosphate, 1-ethyl-3-methylimidazolium bis (trifluoromethylsulfonyl)imide, 1-ethyl-3-methylimidazolium trifluoromethanesulfonate, 1-butly-1-methylpyrrolidinium bis(trifluoromethylsulfonyl)imide,1-hexyl-3-methylimidazolium hexofluorophosphate,1-ethyl-3-methylimidazolium dicyanamide,11-methyl-3-octylimidazolium tetrafluoroborate, yttria-stabilized zirconia, beta-alumina solid, silver iodide, polyacrylamides, agar, or NASICON.

A fourth aspect can include the system of any one of the first to third aspects, wherein the counter-electrode comprises platinum, a nickel gauze, sintered nickel, zinc, cadmium, lithium, aluminum, magnesium, potassium, sodium, or a combination thereof.

A fifth aspect can include the system of any one of the first to fourth aspects, wherein the metallic support comprises copper, aluminum, silver, tin, cobalt, magnesium, iron, nickel, zinc, bismuth, or a combination thereof.

A sixth aspect can include the system of any one of the first to fifth aspects, wherein the metallic support is in the form of a foil, a mesh, a solid ingot, or a combination thereof.

A seventh aspect can include the system of any one of the first to sixth aspects, wherein the metallic support is electrically coupled to a power source, and wherein the metallic support and power sources are configured to pass current through the metallic support.

An eighth aspect can include the system of any one of the first to seventh aspects, wherein the metallic support comprises metallic ions with a valence state greater than or equal to 0.

A ninth aspect can include the system of any one of the first to eighth aspects, wherein the active material has a layered-structured.

A tenth aspect can include the system of any one of the first to ninth aspects, wherein the active material is selected from the group consisting of electrolytic manganese dioxide (EMD), birnessite ($\delta$-$MnO_2$), $\alpha$-$MnO_2$, nickel hydroxide [$Ni(OH)_2$], a vanadium oxide, molybdenum disulfide ($MoS_2$), $Mo_6S_8$ Chevrel-phase compound, a chalcogenide compound, a bismuth selenide, a transition metal dichalcogenide, graphite, a layered clay, kaolinite, dickite, halloysite, nacrite, montmorillonite, nontronite, beidellite, saponite, smectite, illite, sepiolite, attapulgite, clinochlore, chamosite, nimite, pennantite, baileychlore, chamosite, cookeite, donbassite, gonyerite, odinite, orthochamosite, ripidolite, sudoite, a compound with brucite structure, a compound with buserite structure, hydrotalcites with general formula $[M^{II}_{1-x}M^{III}_{x}(OH)_2]^{x+}[A^{n-}_{x/n} mH_2O]^{x-}$ where M is selected from the group Zn, Ni, Fe, Co, Cu, Mg, Mn, Al, Fe, In, Ga, Cr, and $A^{n-}$ is $ClO_4^-$, $Cl^-$, $NO_3^-$, $SO_4^{2-}$, and combinations thereof.

An eleventh aspect can include the system of any one of the first to tenth aspects, wherein the electrode paste comprises an additive selected from the group consisting of bismuth oxide, lead oxide, cobalt oxide, bismuth hydroxide, cobalt hydroxide, copper hydroxide, and combinations thereof.

A twelfth aspect can include the system of the eleventh aspect, wherein the active material has layered-structured, and wherein the electrode paste further comprises a molar ratio of the layered-structure material and the additive in the range of 0 to 40.

A thirteenth aspect can include the system of any one of the first to twelfth aspects, wherein the electrode paste further comprises a binder, and wherein the binder comprises a polytetrafluoroethylene, methyl cellulose (MC), carboxymethyl cellulose (CMC), hydroxypropyl cellulose (HPC), hydroxypropylmethyl cellulose (HPMC), hydroxyehtylmethyl cellulose (HEMC), carboxymethylhydroxyethyl cellulose, hydroxyethyl cellulose (HEC), polyvinyl alcohol, polyvinylacetate, polyaniline, polyvinylpyrrolidone, polyvinylidene fluorid, polypyrrole, sodium alginate, styrene butadiene rubber, or a combination thereof.

A fourteenth aspect can include the system of any one of the first to thirteenth aspects, wherein the electrode paste is 1-99 wt. % active material, 0-99 wt. % conductive material, and a binder for the remainder.

A fifteenth aspect can include the system of any one of the first to fourteenth aspects, wherein the electrode paste has a porosity between 5-95%.

A sixteenth aspect can include the system of any one of the first to fifteenth aspects, further comprising a polymeric separator between the working electrode and the counter-electrode.

In a seventeenth aspect, a method of forming a layered structure comprises: forming an electrochemical cell between a working electrode, a counter electrode, and an electrolyte, wherein the working electrode comprises: a metallic support; an electrode paste in contact with the metallic support, wherein the electrode paste comprises: an active material; and a binder; passing an electric current through the metallic support; generating metallic ions based on passing the electric current through the metallic support; cycling the working electrode based on passing the current through the metallic support; intercalating the metallic ions into the active material during the cycling of the working electrode; and forming a layered material having the metallic ions intercalated therein based on intercalating the metallic ions into the active material.

An eighteenth aspect can include the method of the seventeenth aspect, wherein the active material comprises a manganese oxide, and wherein cycling the working electrode comprises cycling the manganese oxide to an end of a $2^{nd}$ electron capacity and recharging the manganese oxide.

A nineteenth aspect can include the method of the seventeenth or eighteenth aspect, wherein cycling the working electrode comprises discharging the active material and charging the active material at least once.

A twentieth aspect can include the method of any one of the seventeenth to nineteenth aspects, further comprising: removing the working electrode from the electrochemical cell; and combining the working electrode with a second counter electrode to form a battery.

A twenty first aspect can include the method of any one of the seventeenth to nineteenth aspects, further comprising: removing the layered material from the metallic support; using at least a portion of the layered material to form a third electrode, and using the third electrode in a battery.

A twenty second aspect can include the method of any one of the seventeenth to twenty first aspects, wherein the counter-electrode comprises platinum, a nickel gauze, sintered nickel, zinc, cadmium, lithium, aluminum, magnesium, potassium, sodium, or a combination thereof.

A twenty third aspect can include the method of any one of the seventeenth to twenty second aspects, wherein the metallic support comprises copper, aluminum, silver, tin, cobalt, magnesium, iron, nickel, zinc, bismuth, or a combination thereof.

A twenty fourth aspect can include the method of any one of the seventeenth to twenty third aspects, wherein the metallic support is in the form of a foil, a mesh, a solid ingot, or a combination thereof.

A twenty fifth aspect can include the method of any one of the seventeenth to twenty fourth aspects, wherein the metallic support is electrically coupled to a power source, and wherein the metallic support and power sources are configured to pass current through the metallic support.

A twenty sixth aspect can include the method of any one of the seventeenth to twenty fifth aspects, wherein the active material has a layered-structured.

A twenty seventh aspect can include the method of any one of the seventeenth to twenty sixth aspects, wherein the active material is selected from the group consisting of electrolytic manganese dioxide (EMD), birnessite ($\delta$-$MnO_2$), $\alpha$-$MnO_2$, nickel hydroxide [$Ni(OH)_2$], a vanadium oxide, molybdenum disulfide ($MoS_2$), $Mo_6S_8$ Chevrel-phase compound, a chalcogenide compound, a bismuth selenide, a transition metal dichalcogenide, graphite, a layered clay, kaolinite, dickite, halloysite, nacrite, montmorillonite, nontronite, beidellite, saponite, smectite, illite, sepiolite, attapulgite, clinochlore, chamosite, nimite, pennantite, baileychlore, chamosite, cookeite, donbassite, gonyerite, odinite, orthochamosite, ripidolite, sudoite, a compound with brucite structure, a compound with buserite structure, hydrotalcites with general formula $[M^{II}_{1-x}M^{III}_{x}(OH)_2]^{x+}[A^{n-}_{x/n} mH_2O]^{x-}$ where M is selected from the group Zn, Ni, Fe, Co, Cu, Mg, Mn, Al, Fe, In, Ga, Cr, and $A'''^-$ is $ClO_4^-$, $Cl^-$, $NO_3^-$, $SO_4^{2}$, and combinations thereof.

A twenty eighth aspect can include the method of any one of the seventeenth to twenty seventh aspects, wherein the electrode paste comprises an additive selected from the group consisting of bismuth oxide, lead oxide, cobalt oxide, bismuth hydroxide, cobalt hydroxide, copper hydroxide, and combinations thereof.

A twenty ninth aspect can include the method of the twenty eighth aspect, wherein the active material has layered-structured, and wherein the electrode paste further comprises a molar ratio of the layered-structure material and the additive in the range of 0 to 40.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

What is claimed is:

1. A system for forming with a metallic ion intercalated layered structure comprising:
   a housing;
   an electrolyte disposed in the housing;
   a counter-electrode comprising an interacting material disposed in the housing; and
   a working electrode disposed in the housing, wherein the working electrode comprises:
      a metallic support;
      an electrode paste comprising:
         an active material, wherein the active material has a layered-structure, and wherein the active material has metallic ions from the metallic support intercalated into the layered-structure; and
         a binder,
   wherein the active material has additional metallic ions from the counter-electrode intercalated into the layered-structure.

2. The system of claim 1, wherein the electrolyte is one of an acidic electrolyte, an alkaline electrolyte, an ionic liquid electrolyte, an organic-based electrolyte, a solid-phase electrolyte, a gelled electrolyte, or a combination thereof.

3. The system of claim 1, wherein the electrolyte is one of a chloride, a sulfate, potassium hydroxide, sodium hydroxide, lithium hydroxide, perchlorates, lithium hexafluorophosphate, 1-ethyl-3-methylimidazolium bis(trifluoromethylsulfonyl) imide, 1-ethyl-3-methylimidazolium trifluoromethanesulfonate, 1-butly-1-methylpyrrolidinium bis(trifluoromethylsulfonyl) imide, 1-hexyl-3-methylimidazolium hexofluorophosphate, 1-ethyl-3-methylimidazolium dicyanamide, 11-methyl-3-octylimidazolium tetrafluoroborate, yttria-stabilized zirconia, beta-alumina solid, silver iodide, polyacrylamides, agar, or NASICON.

4. The system of claim 1, wherein the counter-electrode comprises platinum, a nickel gauze, sintered nickel, zinc, cadmium, lithium, aluminum, magnesium, potassium, sodium, or a combination thereof.

5. The system of claim 1, wherein the metallic support comprises copper, aluminum, silver, tin, cobalt, magnesium, iron, nickel, zinc, bismuth, or a combination thereof.

6. The system of claim 1, wherein the metallic support is in the form of a foil, a mesh, a solid ingot, or a combination thereof.

7. The system of claim 1, wherein the metallic support is electrically coupled to a power source, and wherein the metallic support and power sources are configured to pass current through the metallic support.

8. The system of claim 1, wherein the metallic support comprises metallic ions with a valence state greater than or equal to 0.

9. The system of claim 1, wherein the active material is selected from the group consisting of nickel hydroxide [Ni(OH)$_2$], a vanadium oxide, molybdenum disulfide (MoS$_2$), Mo$_6$S$_8$ Chevrel-phase compound, a chalcogenide compound, a bismuth selenide, a transition metal dichalcogenide, graphite, a layered clay, kaolinite, dickite, halloysite, nacrite, montmorillonite, nontronite, beidellite, saponite, smectite, illite, sepiolite, attapulgite, clinochlore, chamosite, nimite, pennantite, baileychlore, chamosite, cookeite, donbassite, gonyerite, odinite, orthochamosite, ripidolite, sudoite, a compound with brucite structure, a compound with buserite structure, hydrotalcites with general formula $[M_{1-x}^{II}M_x^{III}(OH)_2]^{x+}[A_{x/n}^{n-}mH_2O]^{x-}$ where M is selected from the group Zn, Ni, Fe, Co, Cu, Mg, Mn, Al, Fe, In, Ga, Cr, and $A^{n-}$ is ClO$_4^-$, Cl$^-$, NO$_3^-$, SO$_4^{2-}$, and combinations thereof.

10. The system of claim 1, wherein the electrode paste comprises an additive selected from the group consisting of bismuth oxide, lead oxide, cobalt oxide, bismuth hydroxide, cobalt hydroxide, copper hydroxide, and combinations thereof.

11. The system of claim 10, wherein the electrode paste further comprises a molar ratio of the layered-structure material and the additive in a range of 0 to 40.

12. The system of claim 1, wherein the electrode paste further comprises a binder, and wherein the binder comprises a polytetrafluoroethylene, methyl cellulose (MC), carboxymethyl cellulose (CMC), hydroxypropyl cellulose (HPC), hydroxypropylmethyl cellulose (HPMC), hydroxyehtylmethyl cellulose (HEMC), carboxymethylhydroxyethyl cellulose, hydroxyethyl cellulose (HEC), polyvinyl alcohol, polyvinylacetate, polyaniline, polyvinylpyrrolidone, polyvinylidenefluoride, polypyrrole, sodium alginate, styrene butadiene rubber, or a combination thereof.

13. The system of claim 1, wherein the electrode paste is 1-99 wt. % active material, 0-99 wt. % conductive material, and a binder for the remainder.

14. The system of claim 1, wherein the electrode paste has a porosity between 5-95%.

15. The system of claim 1, further comprising a polymeric separator between the working electrode and the counter-electrode.

16. A method of forming a layered structure, the method comprising:
forming an electrochemical cell between a working electrode, a counter electrode, and an electrolyte, wherein the working electrode comprises:
a metallic support;
an electrode paste in contact with the metallic support, wherein the electrode paste comprises:
an active material; and
a binder;
passing an electric current through the metallic support;
generating metallic ions based on passing the electric current through the metallic support;
generating additional metallic ions based on passing the electric current through the counter electrode;
cycling the working electrode based on passing the current through the metallic support;
intercalating the metallic ions generated from the metallic support and the additional metallic ions generated from the counter electrode into the active material during the cycling of the working electrode; and
forming a layered material having the metallic ions intercalated therein based on intercalating the metallic ions into the active material.

17. The method of claim 16, wherein the active material comprises a manganese oxide, and wherein cycling the working electrode comprises cycling the manganese oxide to an end of a $2^{nd}$ electron capacity and recharging the manganese oxide.

18. The method of claim 17, wherein cycling the working electrode comprises discharging the active material and charging the active material at least once.

19. The method of claim 16, further comprising:
removing the working electrode from the electrochemical cell; and
combining the working electrode with a second counter electrode to form a battery.

20. The method of claim 16, further comprising:
removing the layered material from the metallic support;
using at least a portion of the layered material to form a third electrode, and
using the third electrode in a battery.

21. The method of claim 16, wherein the counter-electrode comprises platinum, a nickel gauze, sintered nickel, zinc, cadmium, lithium, aluminum, magnesium, potassium, sodium, or a combination thereof.

22. The method of claim 16, wherein the metallic support comprises copper, aluminum, silver, tin, cobalt, magnesium, iron, nickel, zinc, bismuth, or a combination thereof.

23. The method of claim 16, wherein the metallic support is in the form of a foil, a mesh, a solid ingot, or a combination thereof.

24. The method of claim 16, wherein the metallic support is electrically coupled to a power source, and wherein the metallic support and power sources are configured to pass current through the metallic support.

25. The method of claim 16, wherein the active material is selected from the group consisting of α-MnO$_2$, nickel hydroxide [Ni(OH)$_2$], a vanadium oxide, molybdenum disulfide (MoS$_2$), Mo$_6$S$_8$ Chevrel-phase compound, a chalcogenide compound, a bismuth selenide, a transition metal dichalcogenide, graphite, a layered clay, kaolinite, dickite, halloysite, nacrite, montmorillonite, nontronite, beidellite, saponite, smectite, illite, sepiolite, attapulgite, clinochlore, chamosite, nimite, pennantite, baileychlore, chamosite, cookeite, donbassite, gonyerite, odinite, orthochamosite, ripidolite, sudoite, a compound with brucite structure, a compound with buserite structure, hydrotalcites with general formula $[M_{1-x}^{II}M^{III},(OH)_2]^{x+}[A_{x/n}^{n-}mH_2O]^{x-}$ where M is selected from the group Zn, Ni, Fe, Co, Cu, Mg, Mn, Al, Fe, In, Ga, Cr, and $A^{n-}$ is ClO$_4^-$, Cl$^-$, NO$_3^-$, SO$_4^{2-}$, and combinations thereof.

26. The method of claim 16, wherein the electrode paste comprises an additive selected from the group consisting of bismuth oxide, lead oxide, cobalt oxide, bismuth hydroxide, cobalt hydroxide, copper hydroxide, and combinations thereof.

27. The method of claim 26, wherein the electrode paste further comprises a molar ratio of a layered-structure material and the additive in a range of 0 to 40.

* * * * *